United States Patent [19]

Escamilla

[11] 4,034,640
[45] July 12, 1977

[54] PROGRAMMABLE MANUALLY PLAYABLE PIANO

[76] Inventor: Mauricio Guillermo Escamilla, 37-26 58 St., Apt. I Front, Woodside, N.Y. 11377

[21] Appl. No.: 643,788

[22] Filed: Dec. 23, 1975

[51] Int. Cl.$^2$ .................................. G09B 15/08
[52] U.S. Cl. ........................................... 84/478
[58] Field of Search .......... 84/478, 483, 484, 479, 84/480, 481

[56] References Cited

U.S. PATENT DOCUMENTS

| | | | |
|---|---|---|---|
| 2,675,731 | 4/1954 | Ruben | 84/478 |
| 2,811,072 | 10/1957 | Isaacson | 84/478 |
| 2,897,712 | 8/1959 | Merchant | 84/478 |
| 3,958,487 | 5/1976 | Goldman | 84/478 |

Primary Examiner—Stephen J. Tomsky
Attorney, Agent, or Firm—Joel Halpern

[57] ABSTRACT

A programmable piano has a keyboard in which each of the keys has a transparent window and a rotatable roller is mounted beneath the keyboard such that the surface of the roller directly beneath each of the keys is visible through the transparent window thereof. A sheet of music is carried by the roller and has a progression of notes thereon which are representative of a musical composition. A motor drives the roller and thereby presents to the windows of the keys in proper order and at a regulated rate the progression of notes so that a person can play the musical composition by manipulation of the keys selectively in accordance with the notes which appear in the windows.

5 Claims, 5 Drawing Figures

PROGRAMMABLE MANUALLY PLAYABLE PIANO

BACKGROUND OF THE INVENTION

The present invention relates to a programmable piano and more particularly to a piano of this character which is playable manually.

Mechanically played pianos whereby musical compositions are reproduced automatically from a perforated music sheet have been known heretofore. U. S. Pat. No. 901,906 issued Oct. 20, 1908 to F. E. Ives, for example, discloses a typical self playing piano. Numerous improvements have been made in such pianos to more closely simulate the expression of the musical piece or of a particular artist. However, there has been a long standing need to assist a beginner piano student to become familiar with the keyboard and to develop confidence in its manipulation. It would also be of value to provide persons having no music training with an opportunity to play musical compositions upon a piano so that a sense of accomplishment and enjoyment through the medium of music can be achieved.

SUMMARY OF THE INVENTION

It is one object of this invention to provide a manually playable programmable piano having means for furnishing the keys of the keyboard with information as to the progression of notes to be played.

Another object of the invention is to provide a manually playable programmable piano by which an untrained person can play a musical composition and become familiar with the keyboard.

Other objects and advantages of the invention will become readily apparent from the following description of the invention.

According to the present invention there is provided a manually playable programmable piano comprising in combination:

a keyboard having a set of keys each of which keys is adapted upon activation to produce a selected musical note;

means for carrying a predetermined array of information representative of the progression of notes of a musical composition;

means for transmitting the information in the correct musical progression and at a regulatable note to the keys;

an means associated with each of the keys cooperable with the transmitting means for displaying the information in the correct progression.

BRIEF DESCRIPTION OF THE DRAWINGS

In order that the invention may be more fully comprehended it will now be described, by way of example, with reference to the accompanying drawings in which.

DETAILED DESCRIPTION OF THE INVENTION

Figure 1:
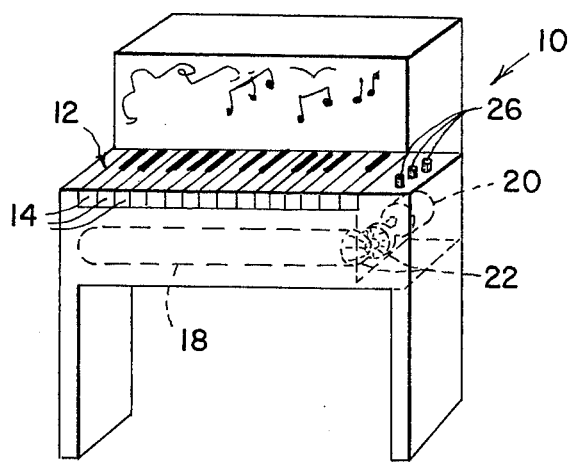
FIG. 1 is a perspective view of a piano constructed in accordance with the invention.
Figure 2:
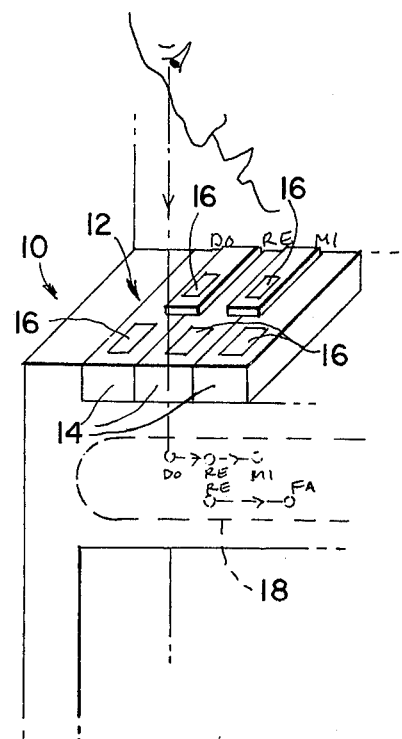
FIG. 2 is a perspective and fragmentary enlarged view of a portion of the keyboard of the piano shown in FIG. 1.
Figure 4:
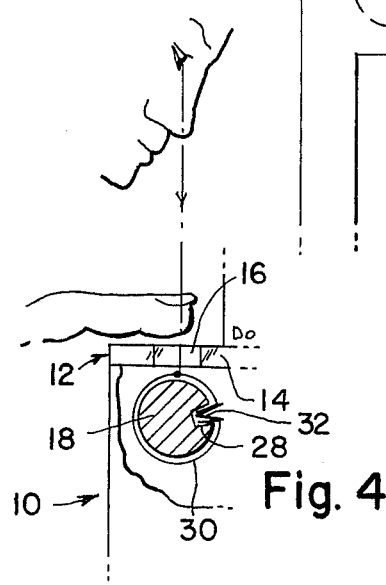
FIG. 4 is an end fragmentary view, partly broken away, of the piano of FIG. 1.

Referring to the drawings, there is shown generally a piano 10 which is constructed in conventional manner so as to have a keyboard 12 comprising a set of keys 14 which are operatively connected to the usual hammer elements. Such hammer elements, upon depression of the keys, strike selected string elements to produce a musical note. When struck in a prescribed pattern the keys will produce a particular musical composition.

As shown each of the keys is provided with a transparent section or window 16. A roller 18 is mounted within the piano beneath the keyboard and extends in generally parallel relation therewith.

Figure 3:
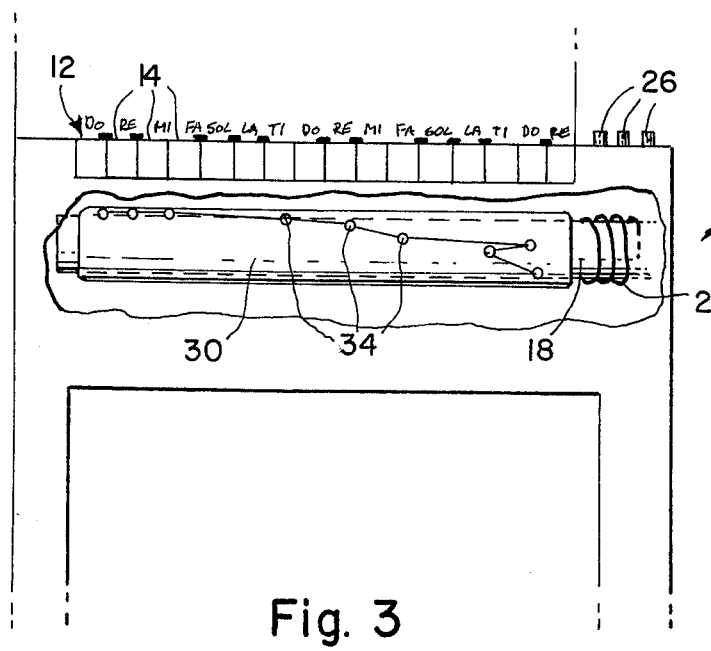
FIG. 3 is a front elevational view, partly broken away to show the disposition of the rotatable roller beneath the keyboard, of the piano of FIG. 1.

The roller is rotatable by means of a motor 20 which may be either electrical as shown in FIG. 1 and is operatively connected to the roller by at least one pair of gears 22, or the motor may be machanical as represented by spring 24 shown in FIG. 3. In either instance appropriate speed control means 26 is provided for rotating the roller at a predetermined rotational speed. Such speed, of course, is correlated to the musical composition to be played.

The roller may be provided with a slot 28 in the circumference thereof dimensioned to receive the ends of a sheet of music 30 tightly. Thus, a resilient element 32 may be positioned within slot 28 which is adapted to detachably retain the ends of the sheet of music for rotation with the roller.

Figure 5:
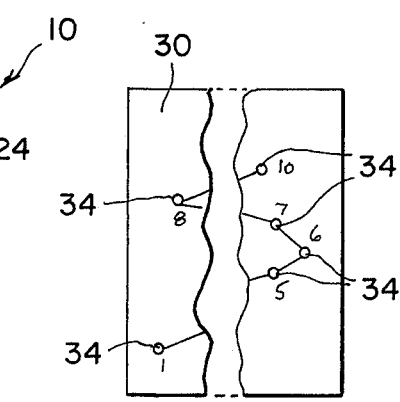
FIG. 5 is a plan view of a sheet of music utilizable with the piano of the invention.

As can be seen most clearly in FIG. 5, the sheet of music is provided with an array or series of markings 34 which are representative of the progression of notes of a musical composition. The lateral spacing between the markings corresponds with the spacings between the keys so that as the roller turns the markings will appear in proper order beneath the keys which correspond tonally with the notes which such markings represent. The longitudinal spacing between the markings provides a guide as to the tempo of the music to be played. It will be understood, of course, that any symbol can be selected to represent on the music sheet the note to be played upon the piano.

It will be apreciated, from the foregoing, that as the roller rotates beneath the keyboard the markings on the sheet of music will sequentially appear within the windows of the keys according to the progression of notes in the musical composition. The piano player activates the keys in accordance with the sequence of markings which appear in the windows. In this manner a person totally untrained in music is enabled to play the musical composition carried by the sheet of music.

It will be understood, of course, that modifications in the specific structure described above can be made without departing from the scope of the invention. Thus, a disc or the like may be provided with the progression of notes in representative form and such disc can be electrically connected with the keyboard so as to illuminate the keys in accordance with the note progression. The essence of the invention is the provision of means for transmitting information to the keys which is representative of the progression of notes of the musical composition and a key construction permitting the display of such information in the order and at the rate transmitted.

I claim:

1. A manually playable programmable piano comprising in combination:

a keyboard having a set of keys each of which is provided with a transparent section of sufficient dimensions to visually inspect a musical record positioned therebeneath, each of said keys being adapted upon activation to produce a selected musical note;

a roller mounted rotatably in said piano beneath said keyboard and in generally parallel relation therewith;

and musical record means detachably mountable on said roller having markings thereon arranged in a pattern representative of the progression and tempo of the notes of a musical composition viewable in predetermined sequence within the transparent sections of said keys.

2. A programmable piano according to claim 1, wherein said roller is motor driven and control means is provided for regulating the rotational speed of said roller.

3. A programmable piano according to claim 2, wherein said motor is mechanical and includes spring means drivably connected to said roller.

4. A programmable piano according to claim 2, wherein said motor is an electric motor and gear means are provided for drivably connecting said motor to said roller.

5. A programmable piano according to claim 1, wherein said musical record means comprises a sheet of music and said marking are spaced laterally and longitudinally on said sheet so as to be representative respectively of the correct musical sequence and tempo of note progression.

* * * * *